United States Patent [19]

Lennig et al.

[11] Patent Number: 5,479,488

[45] Date of Patent: Dec. 26, 1995

[54] METHOD AND APPARATUS FOR AUTOMATION OF DIRECTORY ASSISTANCE USING SPEECH RECOGNITION

[75] Inventors: Matthew Lennig; Robert D. Sharp, both of Westmount; Gregory J. Bielby, Pointe-Claire, all of Canada

[73] Assignee: Bell Canada, Montreal, Canada

[21] Appl. No.: 193,522

[22] Filed: Feb. 8, 1994

[30] Foreign Application Priority Data

Mar. 15, 1993 [CA] Canada ................................ 2091658

[51] Int. Cl.⁶ .............................. H04M 3/64; G10L 9/06
[52] U.S. Cl. ........................... 379/67; 379/213; 395/2.61; 395/2.84
[58] Field of Search ................................ 395/2.49, 2.56, 395/2.61, 2.84; 379/142, 67, 88, 89, 213

[56] References Cited

U.S. PATENT DOCUMENTS

| | | | |
|---|---|---|---|
| 4,696,039 | 9/1987 | Doddington | 381/46 |
| 4,790,003 | 12/1988 | Kepley et al. | 379/88 |
| 4,797,910 | 1/1989 | Daudelin | 379/67 |
| 4,831,550 | 5/1989 | Katz | 395/2 |
| 4,881,261 | 11/1989 | Oliphant et al. | 379/215 |
| 4,896,345 | 1/1990 | Thorne | 379/67 |
| 4,979,206 | 12/1990 | Padden et al. | 379/67 |
| 5,014,303 | 5/1991 | Velius | 379/201 |
| 5,018,201 | 5/1991 | Sugawara | 395/2 |
| 5,163,081 | 11/1992 | Wycherley et al. | 379/52 |
| 5,181,237 | 1/1993 | Dowden et al. | 379/88 |
| 5,267,304 | 11/1993 | Slusky | 379/213 |
| 5,335,266 | 8/1994 | Richardson, Jr. et al. | 379/112 |
| 5,339,352 | 8/1994 | Armstrong et al. | 379/112 |
| 5,357,596 | 10/1994 | Takebayashi et al. | 395/2.84 |

FOREIGN PATENT DOCUMENTS 1162336 2/1984 Canada ................................ 364/412

OTHER PUBLICATIONS

*A\*–Admissible Heuristics for Rapid Lexical Access*, P. Kenny, R. Hollan, V. Gupta, M. Lennig, P. Mermelstein and D. O'Shaughnessy INRS–Télécommunications, Montreal, Quebec, Canada. 1991 IEEE.

*Multiple–Level Evaluation of Speech Recognition Systems*, John F. Pitelli, David Lubensky, Benjamin Chigier, and Hong C. Leung; Speech Technology Group Artificial Intelligence Laboratory, Tu.sPM. 1.3, pp. 165–168.

*Characterization of Directory Assistance Operator–Customer Dialogues in AGT Limited* S. M. (Raj) Ulagaraj AGT Limited, Tu.sPM. 3.2, pp. 193–196.

*Rejection and Keyword Spotting Algorithms for a Directory Assitance City Name Recognition Application*, Benjamin Chigier, Speech Technology Group 1992 IEEE, pp. II–93 to II–96.

*Flexible Vocabulary Recognition of Speech*, Matthew Lennig, Douglas Sharp, Patrick Kenny, Vishwa Gupta and Kristin Precoda, Bell Northern Research and INRS–Télécommunications; Tu. fPM. 1.3, pp. 93–96.

Lubensky, "Word Recognition using Neural Nets, Multi–State Grossian and K–Nearest Neighbor Classifiers", 1991 IEEE International Conference on Acoustics, Speech and Signal Processing, vol. 1 pp. 141–144.

Primary Examiner—Jeffery A. Hofsass
Assistant Examiner—Daniel S. Hunter
Attorney, Agent, or Firm—Thomas Adams

[57] ABSTRACT

In a telecommunications system, automatic directory assistance uses a voice processing unit comprising a lexicon of lexemes and data representing a predetermined relationship between each lexeme and calling numbers in a locality served by the automated directory assistance apparatus. The voice processing unit issues messages to a caller making a directory assistance call to prompt the caller to utter a required one of said lexemes. The unit detects the calling number originating a directory assistance call and, responsive to the calling number and the relationship data computes a probability index representing the likelihood of a lexeme being the subject of the directory assistance call. The unit employs a speech recognizer to recognize, on the basis of the acoustics of the caller's utterance and the probability index, a lexeme corresponding to that uttered by the caller.

20 Claims, 6 Drawing Sheets

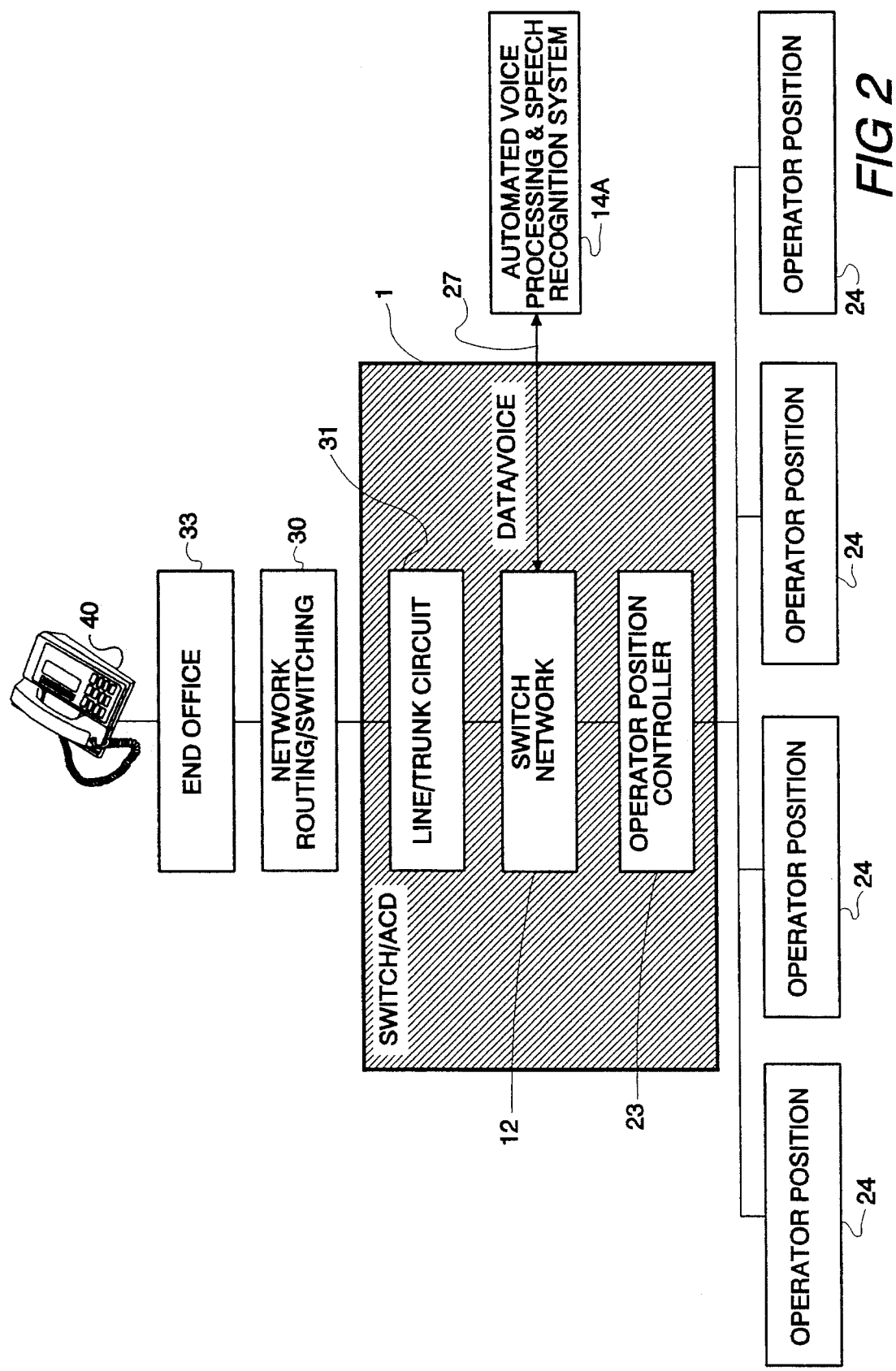

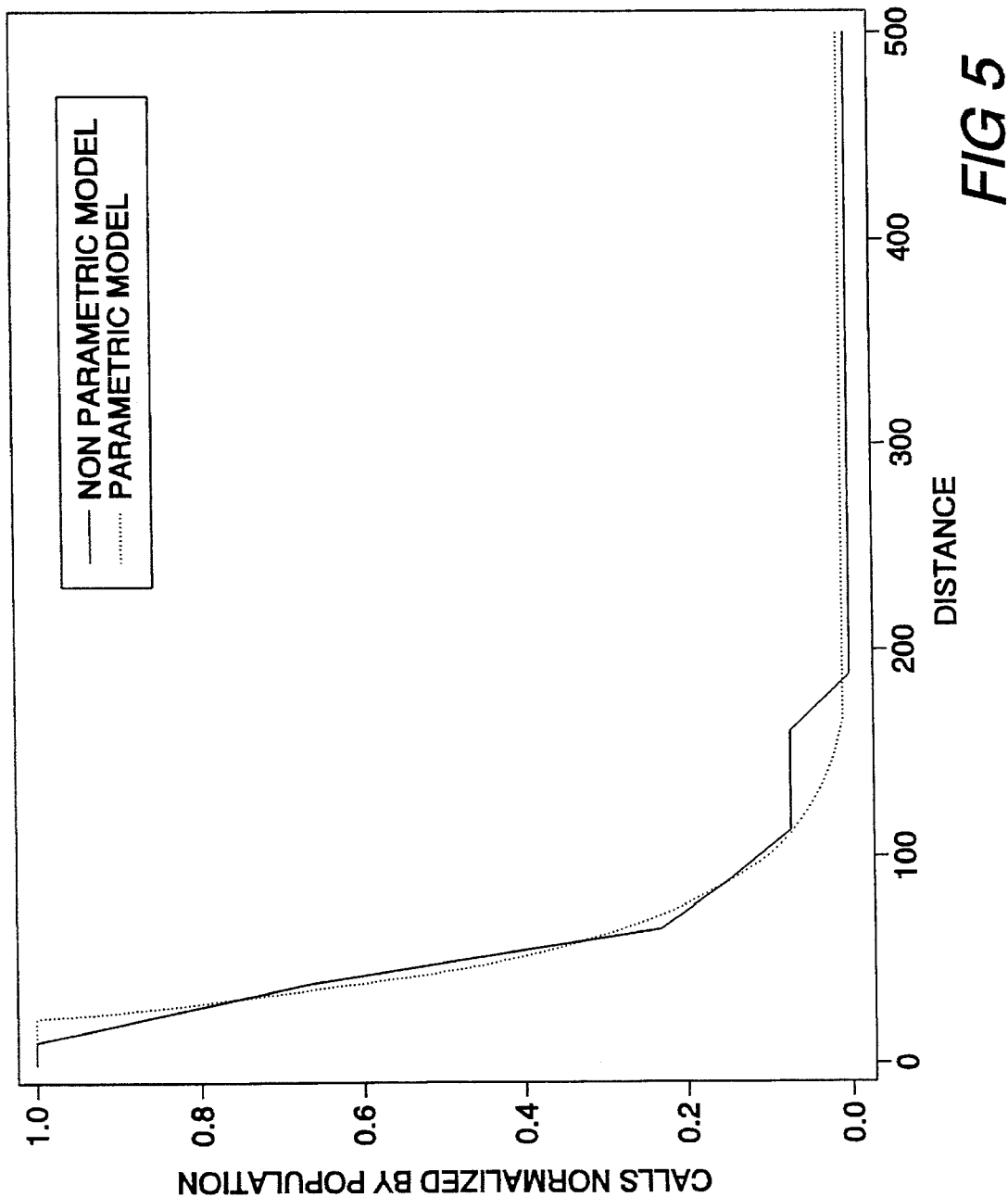

METHOD AND APPARATUS FOR AUTOMATION OF DIRECTORY ASSISTANCE USING SPEECH RECOGNITION

BACKGROUND OF THE INVENTION

1. Technical Field

The invention relates to a method and apparatus for providing directory assistance, at least partially automatically, to telephone subscribers.

2. Background Art

In known telephone systems, a telephone subscriber requiring directory assistance will dial a predetermined telephone number. In North America, the number will typically be 411 or 555 1212. When a customer makes such a directory assistance call, the switch routes the call to the first available Directory Assistance (DA) operator. When the call arrives at the operator's position, an initial search screen at the operator's terminal will be updated with information supplied by the switch, Directory Assistance Software (DAS), and the Operator Position Controller (TPC). The switch supplies the calling number, the DAS supplies the default locality and zone, and the TPC supplies the default language indicator. While the initial search screen is being updated, the switch will connect the subscriber to the operator.

When the operator hears the "customer-connected" tone, the operator will proceed to complete the call. The operator will prompt for locality and listing name before searching the database. When a unique listing name is found, the operator will release the customer to the Audio Response Unit (ARU), which will play the number to the subscriber.

Telephone companies handle billions of directory assistance calls per year, so it is desirable to reduce labour costs by minimizing the time for which a directory assistance operator is involved. As described in U.S. Pat. No. 5,014,303 (Velius) issued May 7, 1991, the entire disclosure of which is incorporated herein by reference, a reduction can be achieved by directing each directory assistance call initially to one of a plurality of speech processing systems which would elicit the initial directory assistance request from the subscriber. The speech processing system would compress the subscriber's spoken request and store it until an operator position became available, whereupon the speech processing system would replay the request to the operator. The compression would allow the request to be replayed to the operator in less time than the subscriber took to utter it. Velius mentions that automatic speech recognition also could be employed to reduce the operator work time. In a paper entitled "Multiple-Level Evaluation of Speech Recognition Systems", the entire disclosure of which is incorporated herein by reference, John F. Pitrelli et al disclose a partially automated directory assistance system in which speech recognition is used to extract a target word, for example a locality name, from a longer utterance. The system strips off everything around the target word so that only the target word is played back to the operator. The operator initiates further action.

U.S. Pat. No. 4,797,910 (Daudelin) issued Jan. 10, 1989, the entire disclosure of which is incorporated herein by reference, discloses a method and apparatus in which operator involvement is reduced by means of a speech recognition system which recognizes spoken commands to determine the class of call and hence the operator to which it should be directed. The savings to be achieved by use of Daudelin's speech recognition system are relatively limited, however, since it is not capable of recognizing anything more than a few commands, such as "collect", "calling card", "operator", and so on.

These known systems can reduce the time spent by a directory assistance operator in dealing with a directory assistance call, but only to a very limited extent.

SUMMARY OF THE INVENTION

The present invention seeks to eliminate, or at least mitigate, the disadvantages of the prior art and has for its object to provide an improved new directory assistance apparatus and method capable of reducing, or even eliminating, operator involvement in directory assistance calls.

To this end, according to one aspect of the present invention, there is provided directory assistance apparatus for use in a telephone system, comprising a voice processing unit having at least one lexicon of lexemes potentially recognizable by the unit and data representing a predetermined relationship between each of said lexemes and each of a plurality of call sources in an area served by the directory assistance apparatus. The unit also has means for issuing messages to a caller making a directory assistance call to prompt the caller to utter a required one of the lexemes, and means for detecting an identifier, for example a portion of a calling number, for the call source from whence the directory assistance call was received, means responsive to the identifier detected and to the data for computing a probability index for each lexeme representing the likelihood of that particular one of said lexemes being that uttered by the caller, and speech recognition means for selecting from the lexicon, on the basis of the acoustics of the caller's utterance and the probability index, a lexeme corresponding to that uttered by the caller.

A lexeme is a basic lexical unit of a language and comprises one or several words, the elements of which do not separately convey the meaning of the whole.

Preferably, the voice processing unit has several lexicons, each comprising a group of lexemes having a common characteristic, for example name, language, geographical area, and the speech recognition means accesses the lexicons selectively in dependence upon a previous user prompt.

Computation of the probability index may take account of a priori call distribution. A priori call distribution weights the speech recognition decision to take account of a predetermined likelihood of a particular locality containing a particular destination being sought by a caller. The apparatus may use the caller's number to identify the locality from which the caller is making the call.

The probability index might bias the selection in favour of, for example, addresses in the same geographical area, such as the same locality.

In preferred embodiments of the present invention the voice processing unit elicits a series of utterances by a subscriber and, in dependence upon a listing name being recognized, initiates automatic accessing of a database to determine a corresponding telephone number.

The apparatus may be arranged to transfer or "deflect" a directory assistance call to another directory assistance apparatus when it recognizes that the subscriber has uttered the name of a locality which is outside its own directory area. In such a situation, the above-mentioned predetermined relationship between the corresponding lexeme and the call source is that the lexeme relates to a locality which is not served by the apparatus.

Thus, embodiments of the invention may comprise means for prompting a subscriber to specify a locality, means for detecting a place name uttered in response, means for comparing the uttered place name with the lexicon and in dependence upon the results of the comparison selecting a message and playing the message to the subscriber. If the place name has been identified precisely as a locality name served by the apparatus, the message may prompt the caller for more information. Alternatively, if the locality name is not in the area served by the apparatus, the message could be to the effect that the locality name spoken is in a different calling or directory area and include an offer to give the subscriber the directory assistance number to call. In that case, the speech recognition system would be capable of detecting a positive answer and supplying the appropriate area code. Another variation is that the customer could be asked if the call should be transferred to the directory assistance operator in the appropriate area. If the subscriber answered in the affirmative, the system would initiate the call transfer.

The caller's responses to the speech recognition system may be recorded. If the system disposed of the call entirely without the assistance of the operator, the recording could be erased immediately. On the other hand, if the call cannot be handed entirely automatically, at the point at which the call is handed over to the operator, the recording of selected segments of the subscriber's utterances could be played back to the operator. Of course, the recording could be compressed using the prior art techniques mentioned above.

According to a second aspect of the invention, a method of at least partially automating directory assistance in a telephone system using directory assistance apparatus comprising a voice processing unit having a lexicon of lexemes potentially recognizable by the unit and data representing a predetermined relationship between each of the lexemes and a calling number in an area served by the automated directory assistance apparatus, comprises the steps of:

issuing messages to a caller making a directory assistance call to prompt the caller to utter one or more utterances, detecting an identifier, such as a calling number originating a directory assistance call, computing, in response to the identifier and said data, a probability index for each lexeme representing the likelihood that the lexeme will be selected, and employing speech recognition means to recognize, on the basis of the acoustics of the caller's utterance and the probability index, a lexeme corresponding to that uttered by the caller.

Preferably, the voice processing unit has several lexicons, each having lexemes grouped according to certain characteristics e.g. names, localities, languages and the method includes the steps of issuing a series of messages and limiting the recognition process to a different one of the lexicons according to the most recent message.

The various objects, features, aspects and advantages of the present invention will become more apparent from the following detailed description, in conjunction with the accompanying drawings, of a preferred embodiment of the invention.

BRIEF DESCRIPTION OF DRAWINGS

FIG. 2 is a simplified block diagram of parts of a telecommunications system employing an embodiment of the present invention;

FIG. 5 is a graph of call distribution according to distance and normalized for population of the called locality.

BEST MODE FOR CARRYING OUT THE INVENTION

Figure 1:
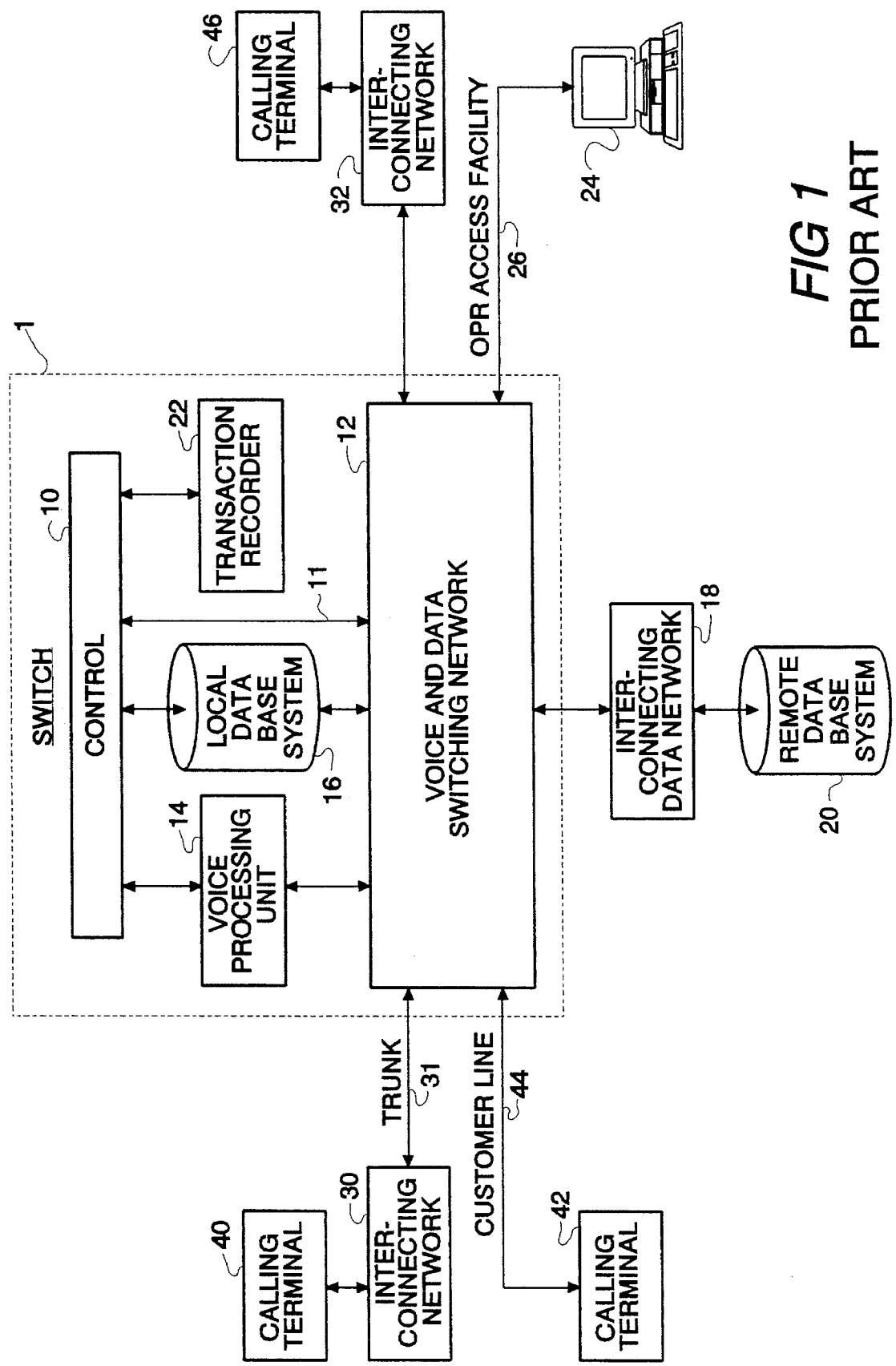
FIG. 1 is a general block diagram of a known telecommunications system.

FIG. 1 is a block diagram of a telecommunications system as described in U.S. Pat. No. 4,797,910. As described therein, block 1 is a telecommunications switch operating under stored program control. Control 10 is a distributed control system operating under the control of a group of data and call processing programs to control various parts of the switch. Control 10 communicates via link 11 with voice and data switching network 12 capable of switching voice and/or data between inputs connected to the switching network. An automated voice processing unit 14 is connected to the switching network 12 and controlled by control 10. The automated voice processing unit receives input signals which may be either voice or dual tone multifrequency (DTMF) signals and is capable of determining whether or not the DTMF signals are allowable DTMF signals and initiating action appropriately. In the system described in U.S. Pat. No. 4,797,910, the voice processing unit is capable of distinguishing between the various elements of a predetermined list of spoken responses. The voice processing unit 14 also is capable of generating tones and voice messages to prompt a customer to speak or key information into the system for subsequent recognition by the speech recognition system. In addition, the voice processing unit 14 is capable of recording a short customer response for subsequent playback to a human operator. The voice processing unit 14 generates an output data signal, representing the result of the voice processing. This output data signal is sent to control 10 and used as an input to the program for controlling establishment of connections in switching network 12 and for generating displays for operator position 24 coupled to the network 12 via line 26. In order to set up operator assistance calls, switch 1 uses two types of database system. Local database 16 is directly accessible by control 10 via switching network 12. Remote database system 20 is accessible to control 10 via switching network 12 and interconnecting data network 18. A remote database system is typically used for storing data that is shared by many switches. For example, a remote database system might store data pertaining to customers for a region. The particular remote database system 20 that is accessed via data network 18 would be selected to be the remote database associated with the region of the called terminal. Interconnecting data network 18 can be any well known data network and specifically could be a common channel signalling system such as the international standard telecommunications signalling system CCS 7.

A transaction recorder 22, connected to control 10, is used for recording data about calls for subsequent processing. Typically, such data is billing data. The transaction recorder 22 is also used for recording traffic data in order to engineer additions properly and in order to control traffic dynamically.

The present invention will be employed in a telecommunications system which is generally similar to that described in U.S. Pat. No. 4,797,910. FIG. 2 is a simplified block diagram of parts of the system involved in a directory assistance call, corresponding parts having the same reference numbers in both FIG. 1 and FIG. 2. As shown in FIG.

2, block 1 represents a telecommunications switch operating under stored program control provided by a distributed control system operating under the control of a group of data and call processing programs to control various parts of the switch. The switch 1 comprises a voice and data switching network 12 capable of switching voice and/or data between inputs and outputs of the switching network. As an example, FIG. 1 shows a trunk circuit 31 connected to an input of the network 12. A caller's station apparatus or terminal 40 is connected to the trunk circuit 31 by way of network routing/switching circuitry 30 and an end office 33. The directory number of the calling terminal, identified, for example, by automatic number identification, is transmitted from the end office switch 33 connecting the calling terminal 40 to switch 1.

An operator position controller 23 connects a plurality of operator positions 24 to the switch network 12. Each operator position 24 comprises a terminal which is used by an operator to control operator assistance calls. Data displays for the terminal are generated by operator position controller 23. A data/voice link 27 connects an automated voice processing unit 14A to the switching network 12. The automated voice processing unit 14A will be similar to that described in US patent number 4,797,910 in that it is capable of generating tones and voice messages to prompt a customer to speak or key dual tone multifrequency (DTMF) information into the system, determining whether or not the DTMF signals are allowable DTMF signals, initiating action appropriately and applying speech recognition to spoken inputs. In addition, the voice processing unit 14A is capable of recording a short customer response for subsequent playback to a human operator.

Whereas, in U.S. Pat. No. 4,797,910, however, the voice processing unit 14 merely is capable of distinguishing between various elements of a very limited list of spoken responses to determine the class of the call and to which operator it should be directed, voice processing unit 14A of FIG. 2 is augmented with software enabling it to handle a major part, and in some cases all, of a directory assistance call.

In order to provide the enhanced capabilities needed to automate directory assistance calls, at least partially, the voice processing unit 14A will employ flexible vocabulary recognition technology and a priori probabilities. For details of a suitable flexible vocabulary recognition system the reader is directed to Canadian patent application number 2,069,675 filed May 27, 1992 and laid open to the public Apr. 9, 1993, the entire disclosure of which is incorporated herein by reference.

A priori probability uses the calling number to determine a probability index which will be used to weight the speech recognition result. The manner in which the a priori probabilities are determined will be described in more detail later with reference to FIGS. 4 and 5.

While it would be possible to use a single lexicon to hold all of the lexemes which it is capable of recognizing, the voice processing unit 14A has several lexicons, for example, a language lexicon, a locality lexicon, a YES/NO lexicon and a business name lexicon. Hence, each lexicon comprises a group of lexemes having common characteristics and the voice processing unit 14A will use a different lexicon depending upon the state of progress of the call, particularly the prompt it has just issued to the caller.

Figure 3A:
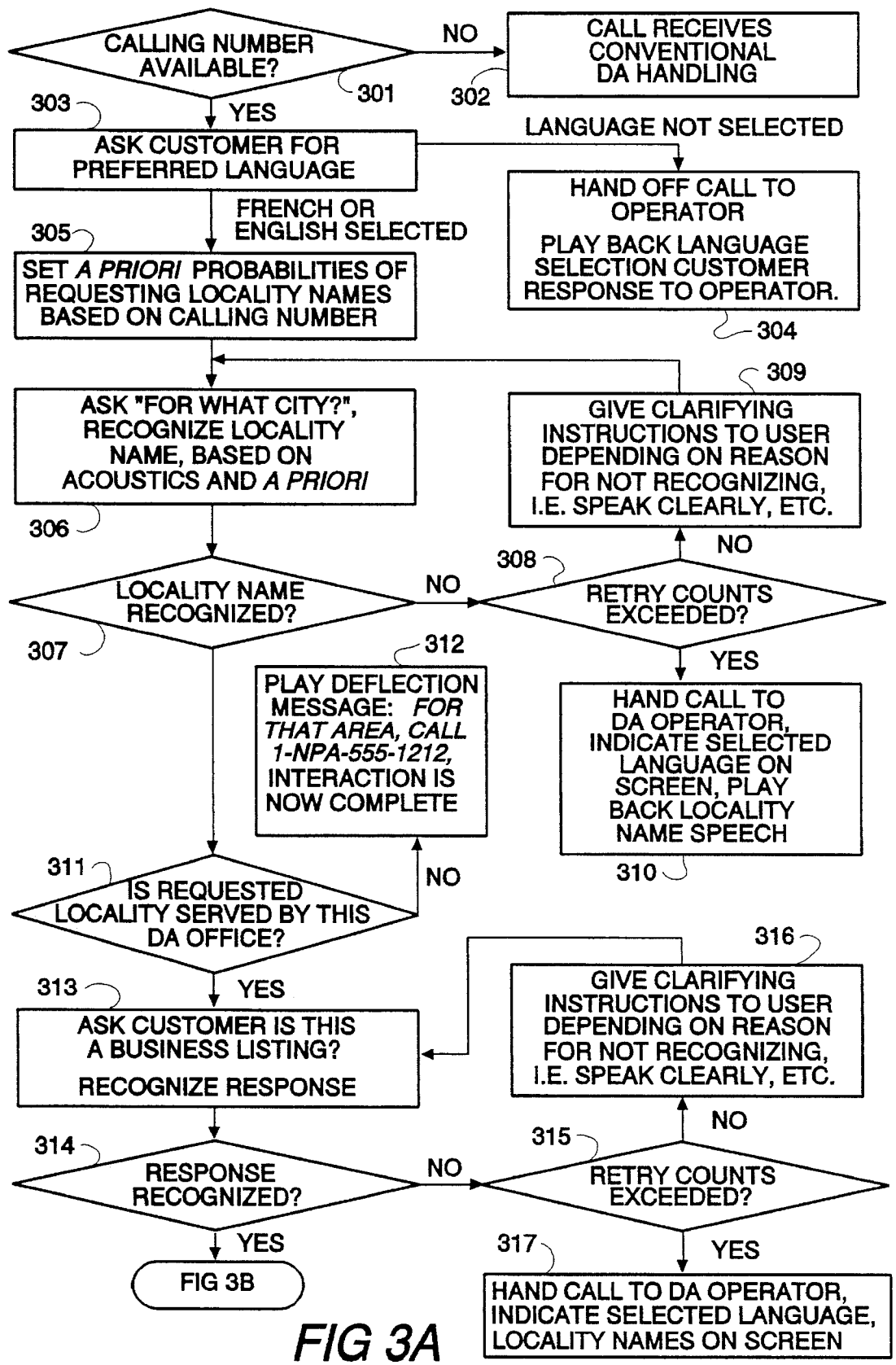
FIGS. 3A and 3B are a general flow chart illustrating the processing of a directory assistance call in the system of FIG. 2.
Figure 3B:
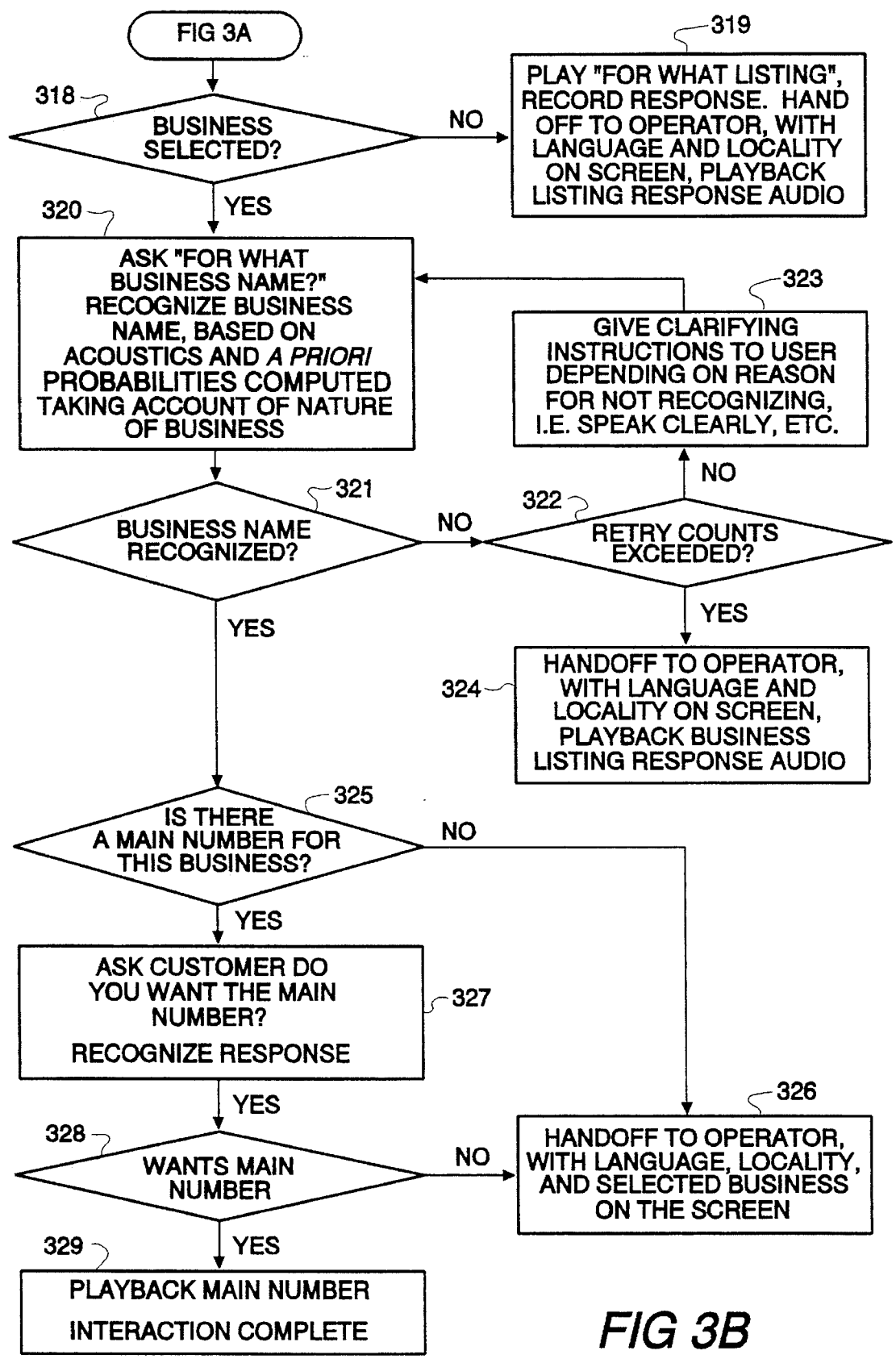

As shown in FIGS. 3A and 3B, in embodiments of the present invention, when the voice processing unit 14A receives a directory assistance call, it determines in step 301 whether or not the number of the calling party is known. If it is not, the voice processing unit immediately redirects the call for handling by a human operator in step 302. If the calling number is known, in step 303 the voice processing unit 14A issues a bilingual greeting message to prompt the caller for the preferred language and compares the reply with a lexicon of languages. At the same time, the message may let the caller know that the service is automated, which may help to set the caller in the right frame of mind. Identification of language choice at the outset determines the language to be used throughout the subsequent process, eliminating the need for bilingual prompts throughout the discourse and allowing the use of a less complex speech recognition system. If no supported language name is uttered, or the answer is unrecognizable, the voice processing unit 14A hands off the call to a human operator in step 304 and plays back to the operator whatever response the caller made in answer to the prompt for language selection. It will be appreciated that the voice processing unit 14A records the caller's utterances for subsequent playback to the operator, as required.

If the caller selects French or English, in step 305 the voice processing unit 14A uses the calling number to set a priori probabilities to determine the likelihood of the locality names in the voice processing unit's locality lexicon being requested. The locality lexicon comprises the names of localities it can recognize, as well as a listing of latitudes and longitudes for determining geographical distances between localities and calling numbers. In step 305, the voice processing unit 14A computes a priori probabilities for each lexeme in the locality lexicon based upon (i) the population of the locality corresponding to the lexeme; (ii) the distance between that locality and the calling number; and (iii) whether or not the calling number is within that locality. The manner in which these a priori probabilities can be determined will be described more fully later.

In step 306, the voice processing unit 14A issues the message "For what city?" to prompt the caller to state the name of a locality, and tries to recognize the name from its locality lexicon using speech recognition based upon the acoustics, as described in the afore-mentioned Canadian patent application number 2,069,675. The voice processing unit will also use the a priori probabilities to influence or weight the recognition process. If the locality name cannot be recognized, decision steps 307 and 308 cause a message to be played, in step 309, to prompt the caller for clarification. The actual message will depend upon the reason for the lack of recognition. For example, the caller might be asked to speak more clearly. Decision step 308 permits a limited number of such attempts at clarification before handing the call off to a human operator in step 310. The number of attempts will be determined so as to avoid exhausting the caller's patience.

If the locality name is recognized, the voice processing unit 14A determines in step 311 whether or not the locality is served by the directory assistance office handling the call. If it is not, the voice processing unit will play a "deflection" message in step 12 inviting the caller to call directory assistance for that area. It is envisaged that, in some embodiments of the invention, the deflection message might also give the area code for that locality and even ask the caller if the call should be transferred. It should be appreciated that, although some localities for other areas are in the lexicon, and hence recognizable, there is no corresponding data relating them to the calling numbers served by the apparatus since the apparatus cannot connect to them. The "predetermined relationship" between the localities for other areas and the calling numbers is simply that they are not available through the automated directory assistance apparatus which serves the calling numbers.

If the requested locality is served by the directory assistance office handling the call, in step 313 the voice processing unit will transmit a message asking the caller to state whether or not the desired listing is a business listing and employ speech recognition and a YES/NO lexicon to recognize the caller's response. If the response cannot be recognized, decision steps 314 and 315 and step 316 will cause a message to be played to seek clarification. If a predetermined number of attempts at clarification have failed to elicit a recognizable response, decision step 315 and step 317 hand the call off to a human operator. If a response is recognized in step 314, decision step 318 (FIG. 38) determines whether or not a business was selected. If not, step 319 plays the message "For what listing?" and, once the caller's response has been recorded, hands off to the human operator.

If decision step 318 indicates that the required number is a business listing, in step 320 the voice processing unit 14A plays a message "For what business name?" and employs speech recognition and a business name lexicon to recognize the business name spoken by the caller in reply. Once again, the recognition process involves an acoustic determination based upon the acoustics of the response and a priori probabilities.

If the business name cannot be recognized, in steps 321,322 and 323 the unit prompts the caller for clarification and, as before, hands off to a human operator in step 324 if a predetermined number of attempts at clarification fail.

It should be noted that, when the unit hands off to a human operator in step 310, 317, 319 or 324, the operator's screen will display whatever data the automatic system has managed to determine from the caller and the recording of the caller's responses will be replayed.

If the unit recognizes the business name spoken by the caller, in step 325 the unit determines whether or not the database 16 lists a main number for the business. If not, the unit hands off to the human operator in step 326 and language, locality and selected business will be displayed on the operator's screen. If there is a main number for the business, in step 327 the unit plays a message asking if the caller wants the main number and uses speech recognition to determine the answer. If the caller's response is negative, step 328 hands off to the human operator. If the caller asks for the main number, however, in step 329 the unit instructs the playing back of the main number to the caller, and terminates the interaction with the caller.

As mentioned earlier, the use of a priori probabilities enhances the speech recognition capabilities of the voice processing unit 14A. Determination of a priori probabilities for locality names (step 305) will now be described. (A priori probabilities for other lexicons can be determined in a similar manner appropriate to the "predetermined relationship" for that lexicon.)

Statistics collected from directory assistance data show a relation between the origin of a call and its destination. An a priori model of probability that a person in a particular numbering plan area NPA and exchange NXX, i.e. with a phone number (NPA)NXX . . . , will ask for a destination locality d, is an additional piece of information which improves the recognition performance. The a priori model expresses the probability P(d|o) of someone requesting a destination locality d given that they are making the directory assistance call from an originating locality o. The probability p(d|o) depends upon the population of destination locality d and the distance between destination locality d and originating locality o. The originating locality o from which the directory assistance call originates is not known precisely. From the originating phone number (NPA)NXX . . . , the Central Office (CO) is identified using the Bellcore mapping. Following that step, a set of possible originating localities associated with that Central Office is considered. The probability of a caller requesting directory assistance for a destination locality d from a phone number (NPA)NXX . . . in an originating locality o is:

$$P(d|(NPA)NXX) = \sum_{o \in CO} P(o)P(d|o) \qquad \text{(Eq 1)}$$

The probability P(o) of each originating locality o associated with a CO originating a call is proportional to its population. Finally, the total recognition score for each locality is a weighted sum of the usual acoustic likelihood $\log P(Y_1 Y_2 \ldots Y_N | d)$ and the logarithm of P(d)|calling(NPA)NXX:

$$\text{Score}(d) = \log P(Y_1 Y_2 \ldots Y_N | d) + \lambda \log P(d|\text{calling}(NPA)NXX) \quad \text{(Eq 2)}$$

An a priori model may be arranged to distinguish between populations having French or English as their first language. Knowing the language selected by the user, the population using that language is used to estimate P(d|o). A minimum value of 10% of the population is used to avoid excessively penalizing a language.

Figure 4:
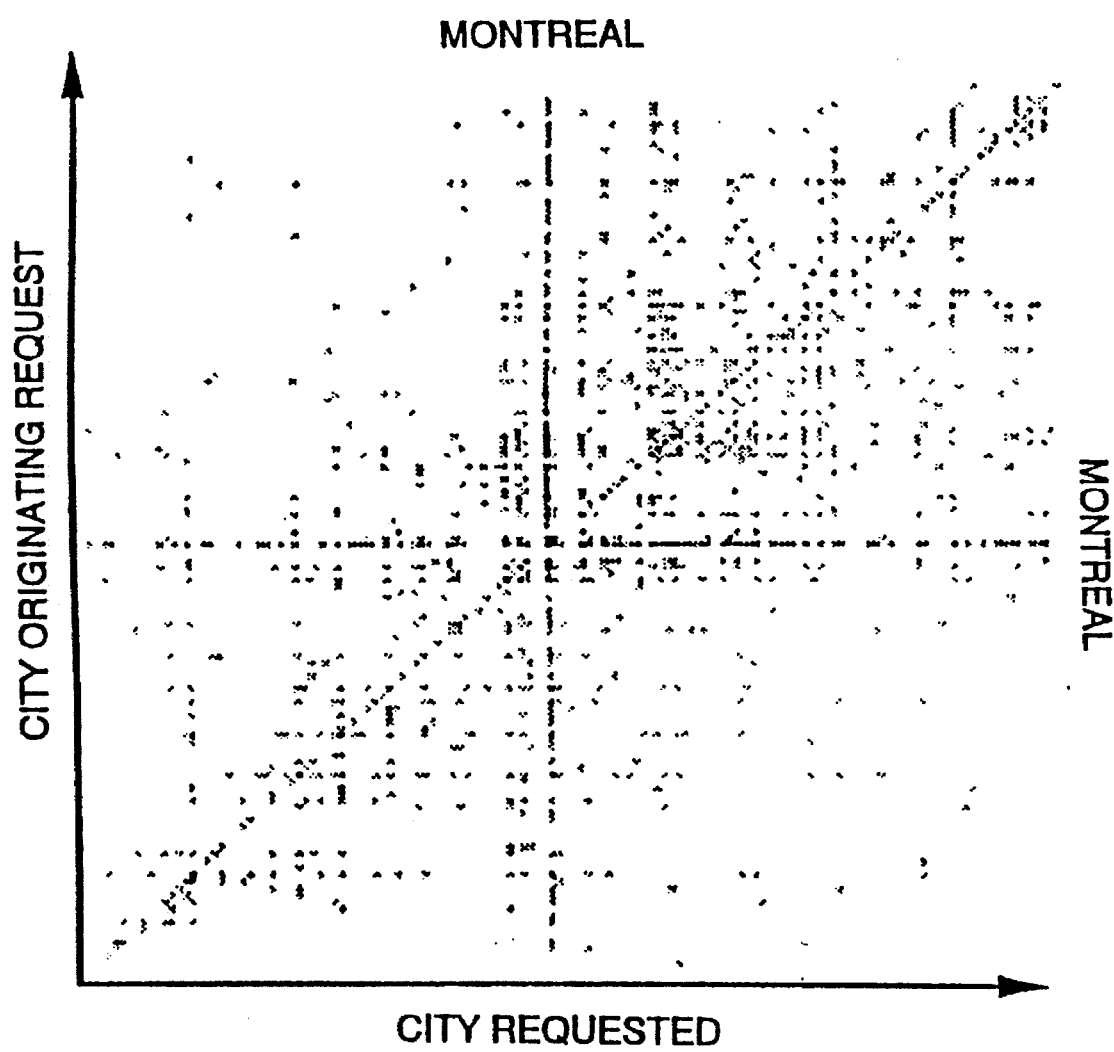
FIG. 4 is a chart illustrating the frequency with which certain localities are requested by callers in the same or other localities.

An example of an a priori probability model developed using directory assistance data collected in the 514, 418 and 819 area codes is shown graphically in FIG. 4. In each of these area codes, the number of requests to and from each exchange (NXX) was collected; faint lines appear indicating the frequency of "any city requesting Montreal"; "Montreal requesting any city"; and "any city requesting itself". From these data it was possible to estimate the parameters of a parametric model predicting the probability of a request for information being made for any target locality given the calling (NPA)NXX. The parameters of the model proposed are the destination locality's population and the distance between the two localities. Where o is the originating locality, d is the destination locality, and S is the size of a locality, then the likelihood of a request about locality d given locality o is $$L(d|o) = S(d) * f(\ )$$

The normalized likelihood is $$\bar{L}(d|o) = 0.60 \frac{L(d|o)}{\sum_{\text{over all } d'} L(d'|o)}$$

where d' denotes supported localities.

When the destination locality is also the originating locality, the likelihood is higher, so this is treated as a special case.

It is assumed that 60% of directory assistance (DA) requests are placed to localities including the originating locality as governed by the equation above, and an additional 40% of DA requests are for the originating locality, giving $$P(d|o) = \bar{L}(d|o), \qquad d \neq o$$
$$= \bar{L}(d|o) + 0.40, \qquad d = o$$

Intuitively, the probability P(d|o) is a function f(o,d) which varies inversely with the distance between localities. In order to better define the function, a table of discrete values for certain distance ranges was derived from community of interest data collected in the three Quebec area codes. The distance units used in this section are the ones used by Bellcore to maintain geographical locality coordinates in North America. One kilometre is roughly equal to 1.83 Bellcore units. The discrete function values f computed for a given distance range in the province of Quebec are given in the Table below for each area code. Since the goal was to obtain an a priori model for the entire province, the values for f(o,d) were computed for the province as a whole through factoring in the probability of a call originating in each area code. This was estimated to be in proportion to the number of exchanges [(NPA)NXX] per area code [NPA] relative to the province as a whole.

This gave F{Province}={0.40f(514)}+{0.27f(819)}+{0.33f(418)}

| distance | 514 | 819 | 418 | Province |
|---|---|---|---|---|
| 0–25 | 1.0 | 1.0 | 1.0 | 1.00 |
| 26–50 | 0.9 | 0.3 | 0.7 | 0.67 |
| 51–75 | 0.4 | 0.0 | 0.2 | 0.23 |
| 76–100 | 0.1 | 0.0 | 0.3 | 0.14 |
| 101–125 | 0.1 | 0.0 | 0.1 | 0.07 |
| 126–150 | 0.1 | 0.0 | 0.1 | 0.07 |
| 151–175 | 0.0 | 0.0 | 0.2 | 0.07 |
| 176–200 | 0.0 | 0.0 | 0.0 | 0.00 |
| >200 | 0.0 | 0.0 | 0.0 | 0.00 |

Given the sparseness of data, the model for obtaining weights as a function of distance was converted from nonparametric to parametric. For this purpose, a least square fit was performed on the data from ranges 26–50 to 151–175. The distance value used in the fitting process was the median distance in each range. An analysis of various function forms for the regression showed that the form below provided the closest fit to the collected data:

$$f'(distance) = \{A/distance\} + B$$

The best coefficients obtained from the analysis were $$A = 33.665$$

$$B = -0.305$$

This function f' reaches zero when the distance is equal to 196 units. In order not to eliminate the possibility of handling a DA request when the distance was greater than this value, the function was modified to accommodate distances of up to twice the maximum distance between any pair of localities with population 10,000 or greater in the province. The two most distant localities that matched this criteria were RouynNoranda and Gaspe at a distance of 2,103 units. The maximum distance at which f would be zero was set to be 4,207 distance units. The function switches to a negative slope linear function at the point where the predicted value of f is 0.01. This corresponds to a distance value of 167.

The final f becomes

The fit of this model to the collected data, labelled "nonparametric model", is shown in FIG. 5.

In order to determine the effects of the a priori model on recognition rate, the model was applied to simulated DA requests, and each token in the test set was re-scored to take a priori likelihood into account. The function used for re-scoring was weighted score nas=+K log {P(old)}, where nas is the normalized acoustic score, the acoustic score over the number of frames in the utterance. The proportionality constant K was trained to maximize the recognition rate over the province of Quebec. The distribution of tokens in the set used for development was normalized to be that predicted by the a priori model. For this reason a correctly recognised simulated DA request from a locality to the same locality carries more weight when computing recognition rate than does a request for a small distant locality with a correspondingly low a priori probability. A recognition rate was thus determined per locality and then the overall provincial recognition rate was computed by taking the sum of the rate for all localities in proportion to their respective populations. The only assumption made in applying the model was that the calling (NPA)NXX was known, which allowed the utterance to be re-scored by mapping it to all localities corresponding to the given entry in the Bellcore database.

The a priori model was further refined in order to avoid fayouting the bigger localities unduly, as the recognition rate for these bigger localities, based on acoustics alone, was already above average. For this purpose, constants were introduced in the model corresponding to population ranges over the target localities in order to reduce the effective populations. These constants were not applied to the modelled distribution of requests since this would invalidate the method for computing the provincial recognition rate. The function defining likelihood becomes $$L(d|o) = K_{r(d)} S(d) f(l\ )$$

where r(d) is a range of destination locality population for which the constant K applies. The best ranges and their associated constants were then determined empirically from a development set.

Thus, using a priori call distribution, and flexible vocabulary recognition, embodiments of the present invention are capable of automating at least the front end of a directory assistance call and in some cases the entire call.

The embodiment of the invention described above is by way of example only. Various modifications of, and alternatives to, its features are possible without departing from the scope of the present invention. For example, the voice processing unit might be unilingual or multilingual rather than bilingual.

The probability index need not be geographical, but might be determined in other ways, such as temporal, perhaps according to time-of-day, or week or season-ofyear. For example, certain businesses, such as banks, are unlikely to be called at one o'clock in the morning whereas taxi firms are. Likewise, people might call a ski resort in winter but not in summer. Hence the nature of the business can be used to weight the selection of certain lexemes for a particular enquiry.

The use of several lexicons, each comprising a group of lexemes, allows the voice processing unit to restrict the field of search for each prompt, thereby improving speed and accuracy. Nevertheless, it would be possible to use a single lexicon rather than the several lexicons described above.

It should be appreciated that although (NPA)NXX numbers have been mentioned, the invention is not limited to North American calls but with suitable modification could handle international calls.

It is envisaged that the voice processing unit 14A might dispense with computing a probability index for all destination localities served by the directory assistance apparatus. Instead, the locality lexemes could be grouped into predetermined subsets according to call identifiers, and the acoustic determination using speech recognition could simply be limited to such a subset. In such a modified system, the voice processing unit 14A would comprise, in addition to the lexicon of localities, data identifying, for each call identifier, a subset of localities to which the speech recognition process would be limited. Process step 305 (FIG. 3A) would be replaced with the step "SELECT A SUBSET OF POTENTIALLY-REQUESTED LOCALITY NAMES BASED UPON CALLING NUMBER". Each subset would be preselected as those localities which gave greatest recognition accuracy, perhaps based upon empirical data acquired during actual service.

Although an embodiment of the invention has been described and illustrated in detail, it is to be clearly understood that the same is by way of illustration and example only and is not to be taken by way of the limitation, the spirit and scope of the present invention being limited only by the appended claims.

We claim: One such input is trunk 31 which connects a calling terminal 40 to the network 12 by way of interconnecting network 30. Another calling terminal 46 is shown connected in like manner by interconnecting network 32. A third calling terminal is connected to the network 12 by customer line 44

1. Directory assistance apparatus for a telephone system comprising: a voice processing unit having at least one lexicon of lexemes potentially recognizable by the unit and data predetermined for each of said lexemes, means for issuing messages to a caller making a directory assistance call to prompt the caller to utter one of said lexemes; means for detecting an identifier for the call source from whence a directory assistance call was received; means responsive to the identifier detected, and to said data, for computing a probability index for each lexeme representing the likelihood of that particular one of said lexemes being that uttered by the caller; and speech recognition means for recognizing, on the basis of the acoustics of the caller's utterance and the probability indexes, a lexeme corresponding to that uttered by the caller.

2. Apparatus as claimed in claim 1, wherein the detecting means serves to detect as said identifier comprising at least a portion of a calling number from whence the directory assistance call was made.

3. Apparatus as claimed in claim 1, further comprising means transmitting to the caller a message giving a directory number determined using the recognized lexeme.

4. Apparatus as claimed in claim 1, wherein the lexemes comprise names of localities within said predetermined area; the data comprise the size of each locality and the distance between each pair of localities; and the means for computing the probability index computes for each locality, the likelihood of the caller requesting that locality based upon the distance between that locality and the caller's locality and upon the size of that locality for which the probability index is being computed.

5. Apparatus as claimed in claim 4, wherein the size of each locality is determined by the number of local active directory numbers in the locality.

6. Apparatus as claimed in claim 1, wherein the voice processing unit has one or more additional lexicons, each lexicon comprising a group of lexemes having a common characteristic, and the speech recognition means accesses the lexicons selectively in dependence upon one or more messages previously issued to the caller.

7. Apparatus as claimed in claim 1, wherein the voice processing unit has one or more additional lexicons, each lexicon comprising a group of lexemes having a common characteristic, the computing means computes said index for the lexicons selectively depending upon one or more messages previously played to the caller and the speech recognition means accesses the lexicons selectively in dependence upon one or more messages previously issued to the caller.

8. Apparatus as claimed in claim 1, wherein the lexemes comprise names businesses and the data comprise the nature of the businesses.

9. Directory assistance apparatus for a telephone system, including a voice processing unit having a lexicon of lexemes potentially recognizable by the unit, said lexemes including lexemes corresponding to localities in a predetermined area served by the directory assistance apparatus and lexemes corresponding to localities not in the predetermined area, the unit including:

means for issuing to a directory assistance caller a message inviting the caller to utter the name of a locality;

means for recognizing one of said lexemes from the utterance;

means for determining whether or not the recognized lexeme is one of said lexemes corresponding to localities not in the predetermined area served by the directory assistance apparatus; and means for playing a message to the caller inviting the caller to direct the directory assistance request to a directory assistance apparatus for an alternative area including the locality corresponding to the recognized lexeme in the event that the recognized lexeme is not in the predetermined area.

10. A method of at least partially automating directory assistance in a telephone system in which directory assistance apparatus comprises a voice processing unit having a lexicon of lexemes potentially recognizable by the unit and data predetermined for each lexeme, the method comprising the steps of:

issuing messages to a caller making a directory assistance call to prompt the caller to utter one of said lexemes;

detecting an identifier for a call source from whence the directory assistance call was received;

computing, in response to the identifier and said data, a probability index for each lexeme representing the likelihood that the lexeme will be that uttered by the caller, and employing speech recognition means to recognize, on the basis of the acoustics of the caller's utterance and the probability index, a lexeme corresponding to that uttered by the caller.

11. A method as claimed in claim 10, wherein the identifier comprises at least a portion of a calling number of the call source.

12. A method as claimed in claim 10, further comprising the step of transmitting a message to the caller giving a directory number determined using the recognized lexeme.

13. A method as claimed in claim 10, wherein the lexemes comprise names of localities within said area; the data comprise the size of each locality and the distance between each pair of localities; and the computing the probability index computes for each locality, the likelihood of the caller requesting that locality based upon the distance between that locality and the caller's locality and upon the size of [the caller's] that locality for which the probability index is being computed.

14. A method as claimed in claim 13, wherein the size of a locality is determined by the number of active directory numbers in the locality.

15. A method as claimed in claim 10, wherein the voice processing unit has one or more additional lexicons, each lexicon comprising a group of lexemes having a common characteristic and the speech recognition means is employed to access the plurality of lexicons selectively in dependence upon one or more messages previously issued to the caller.

16. A method as claimed in claim 10, wherein the voice processing unit has one or more additional lexicons, each lexicons comprising a group of lexemes having a common characteristic, the computing means computes said index for lexemes in the different lexicons selectively, in dependence upon one or more messages previously issued to the caller and the speech recognition means is employed to access the plurality of lexicons selectively in dependence upon one or more messages previously issued to the caller.

17. A method as claimed in claim 10, wherein the lexemes comprise names of businesses and the data comprise the nature of the business.

18. A method of at least partially automating directory assistance in a telephone system having directory assistance apparatus serving a predetermined area and comprising a voice processing unit having a lexicon of lexemes potentially recognizable by the unit, said lexemes including lexemes corresponding to localities in a predetermined area served by the directory assistance apparatus and lexemes corresponding to localities not in the predetermined area, the method including the steps of:

using the voice processing unit to issue to a directory assistance caller a message inviting the caller to utter a name of a locality;

recognizing: one of said lexemes in the utterance;

determining whether or not the recognized lexeme is one of said lexemes corresponding to localities not in said predetermined area served by the apparatus; and playing a message to the caller inviting the caller to direct the directory assistance request to a different directory assistance area in the event the recognized lexeme is not in the predetermined area.

19. Directory assistance apparatus, for a telephone system, comprising: a voice processing unit having at least one lexicon of lexemes potentially recognizable by the unit and data grouping the lexemes into predetermined subsets, each subset comprising lexemes preselected to give greater recognition accuracy for calls from a particular source; means for issuing messages to a caller making a directory assistance call to prompt the caller to utter one of said lexemes; means for detecting an identifier for the call source from whence the directory assistance call was received; means responsive to the detected identifier for selecting one of said predetermined subsets; and speech recognition means limited to the selected subset for recognizing, on the basis of the acoustics of the caller's utterance, a lexeme from said subset corresponding to that uttered by the caller.

20. A method of at least partially automating directory assistance in a telephone system in which directory assistance apparatus comprises a voice processing unit having a lexicon of lexemes potentially recognizable by the unit, and data grouping the lexemes into predetermined subsets, each subset preselected as giving greater recognition accuracy for calls from a particular source, the method comprising the steps of:

issuing messages to a caller making a directory as a distance call to prompt the caller to utter one or more utterances;

detecting an identifier for a call source from whence the directory assistance call was received;

selecting on the basis of the identifier one of said predetermined subsets; and employing speech recognition means to recognize, from the selected subset and on the basis of the acoustics of the caller's utterance, a lexeme corresponding to that uttered by the caller.

* * * * *